United States Patent [19]

Furlong

[11] Patent Number: 4,606,308
[45] Date of Patent: Aug. 19, 1986

[54] ENGINE CYLINDER INTAKE PORT

[75] Inventor: C. Gregory Furlong, Oxford, Mich.

[73] Assignee: General Motors Corporation, Detroit, Mich.

[21] Appl. No.: 776,493

[22] Filed: Sep. 16, 1985

[51] Int. Cl.[4] .............................................. F02F 1/42
[52] U.S. Cl. .............................. 123/188 M; 123/306; 123/193 H
[58] Field of Search .............. 123/188 M, 306, 193 H, 123/52 M

[56] References Cited

U.S. PATENT DOCUMENTS

| 3,020,896 | 2/1962 | Meurer et al. | 123/188 R |
| 3,240,190 | 3/1966 | Christian et al. | 123/276 |
| 3,273,551 | 9/1966 | Julien et al. | 123/188 M |
| 3,335,707 | 8/1967 | Heinrich | 123/188 M |
| 3,868,940 | 3/1975 | Kirchweger | 123/188 M |
| 3,890,949 | 6/1975 | Elsbett et al. | 123/188 M |
| 3,903,849 | 9/1975 | List et al. | 123/188 M |
| 4,159,011 | 6/1979 | Sperry | 123/188 M |
| 4,228,653 | 10/1980 | Sperry | 123/188 M |
| 4,366,787 | 1/1983 | Gale | 123/188 M |
| 4,428,335 | 1/1984 | Cataldo | 123/188 M |
| 4,433,651 | 2/1984 | Nakakita et al. | 123/188 M |
| 4,469,062 | 9/1984 | Ikegami et al. | 123/188 M |
| 4,469,063 | 9/1984 | Sugiura et al. | 123/188 M |
| 4,519,346 | 5/1985 | Nakanishi et al. | 123/188 M |
| 4,537,028 | 8/1985 | Humke | 123/188 M |

FOREIGN PATENT DOCUMENTS

| 46002 | 3/1980 | Japan | 123/188 M |
| 204925 | 11/1983 | Japan | 123/188 M |

Primary Examiner—Ira S. Lazarus
Attorney, Agent, or Firm—Robert J. Outland

[57] ABSTRACT

A cylinder intake port in an internal combustion engine which provides a combination of high swirl and flow efficiency. The port features roof ramps of differing angles leading on opposite sides of a valve axis into a swirl bowl with a shelf portion above the port throat. The flow path below the ramp of lower angle is generally tangent with the outer portion of the cylinder and yields a positive swirl component while the flow area on the opposite side of the valve stem remains relatively unrestricted.

8 Claims, 7 Drawing Figures

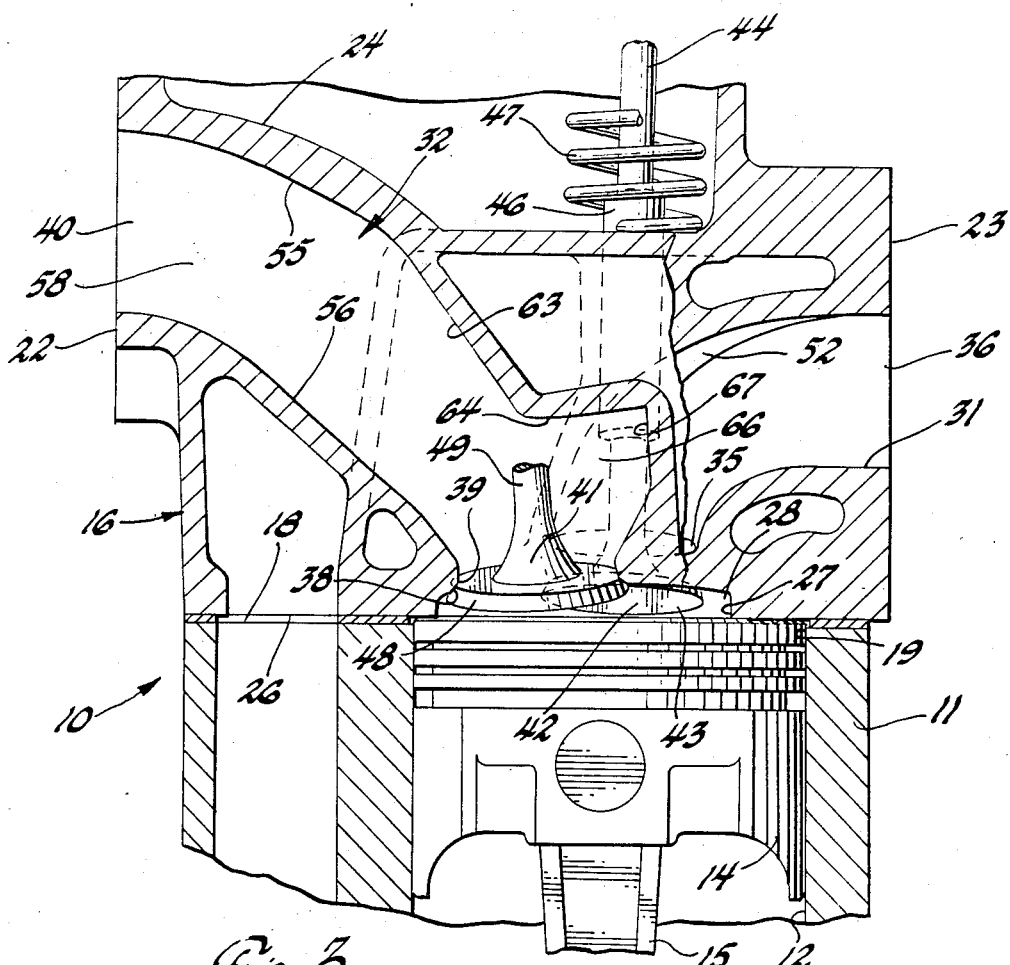

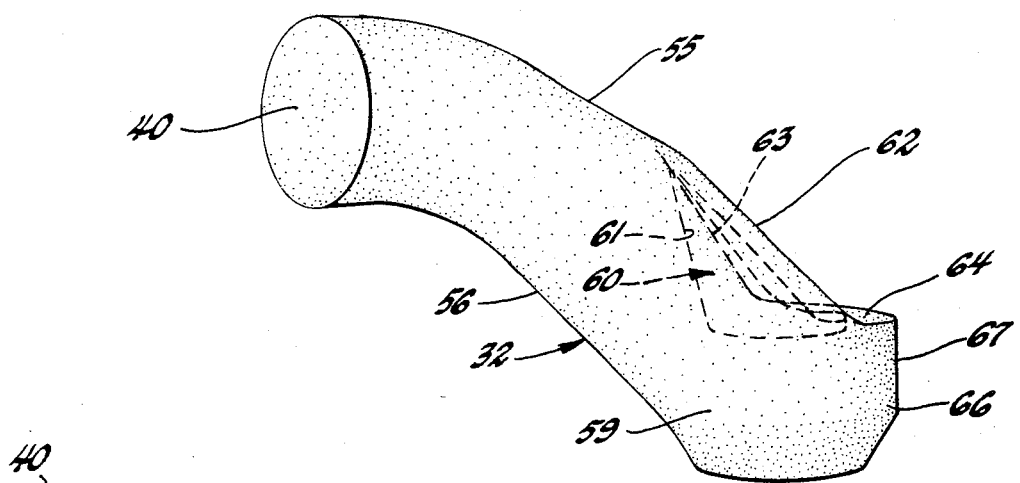
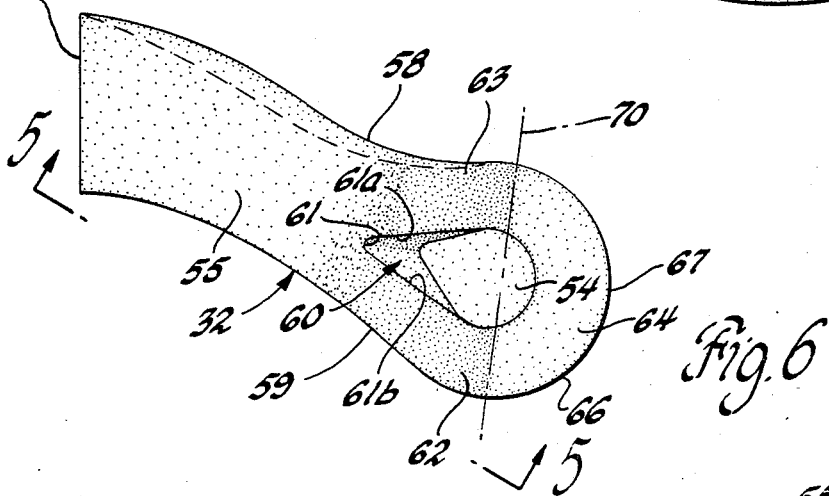
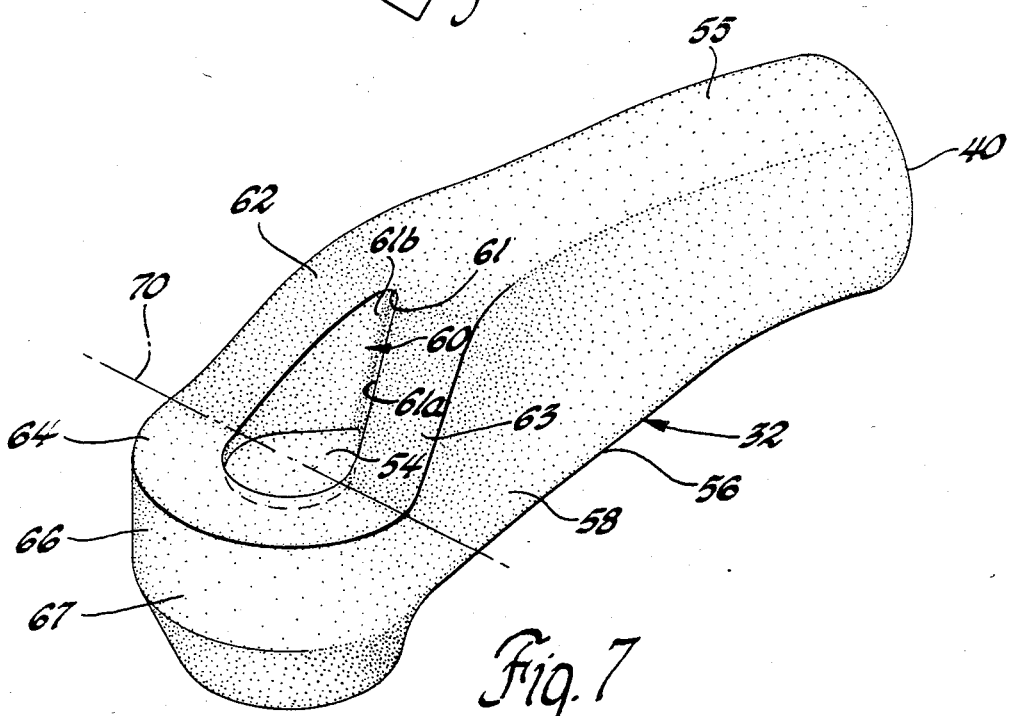

4,606,308

ENGINE CYLINDER INTAKE PORT

TECHNICAL FIELD

This invention relates to internal combustion engines and more particularly to cylinder intake ports for such engines. In particular the invention relates to intake ports in cylinder heads and the like configured to impart swirl to intake charges directed into associated engine combustion chambers and to port configurations for obtaining high flow efficiency combined with swirl.

BACKGROUND

Many configurations of engine cylinder intake ports, or cylinder head inlet ports and the like, have been designed and/or utilized to create rotation or swirl of intake charges supplied to the combustion chamber or cylinder. In general however, intake port, or passage, configurations which have been effective in creating significant charge swirl have also resulted in reducing the mass of charge flowing into each cylinder on its intake stroke so as to result in what is called reduced volumetric efficiency. This implies a reduction in the charge volume when calculated at standard temperature and pressure.

In view of a renewed interest among engine designers in recent years in utilizing increasing amounts of charge swirl in spark ignited internal combustion engines, such as gasoline engines, a large number of proposals for swirl producing intake ports have been made. These have included both fixed geometry intake ports and variable geometry ports which have incorporated one or more movable components intended to provide a high degree of swirl under low engine load conditions and a reduced degree of swirl with improved charging and volumetric efficiency under high load conditions where a maximum cylinder charge is desired. However, a need remains for a simple fixed geometry intake port which can provide a substantial degree of swirl together with high volumetric charging efficiency.

SUMMARY OF THE INVENTION

The present invention provides a fixed geometry engine cylinder intake port for use in internal combustion engines to provide cylinder charge swirl combined with a high degree of cylinder charging, or volumetric, efficiency. The improved intake port construction avoids the use of projecting vanes and side walls or other devices which restrict the flow of intake charges toward one side of the intake port and, instead, provides ramps of differing downward sloping angles on the upper wall of an intake port to direct flow into a swirl bowl under a shelf portion of the intake port at differing degrees of tangency, thereby creating swirl in the bowl portion and through the throat into the adjoining cylinder and combustion chamber. Preferably also, the port configuration in planes normal to the valve axis is such as to provide a relatively straighter flow path into the swirl bowl on the outer side of the valve axis under the shallower angled ramp and a more offset flow path into the swirl bowl on the inner side of the valve axis under the steeper angled ramp. The construction may also include a depending valve guide, with or without a leading edge fairing or guide wing to encourage laminar flow in the port, and is applicable to both curved and relatively straight upstream intake passage configurations.

These and other features and advantages of the invention will be more fully understood from the following description of a preferred embodiment taken together with the accompanying drawings.

BRIEF DRAWING DESCRIPTION

In the drawings:

FIG. 3 is a cross-sectional view of the engine through the cylinder head intake port showing the higher angled ramp from the plane indicated by the line 3—3 of FIG. 1;

FIG. 4 is a cross-sectional view through the cylinder head of FIG. 1 as seen from the plane indicated by the line 4—4 of FIG. 1;

FIG. 5 is a side view of an intake port core for forming a port according to the invention as seen from a plane indicated by line 5—5 of FIG. 6;

FIG. 6 is a top view of the core of FIG. 5, and

FIG. 7 is a pictorial view of the core of FIG. 5.

DETAILED DESCRIPTION

Figure 1:
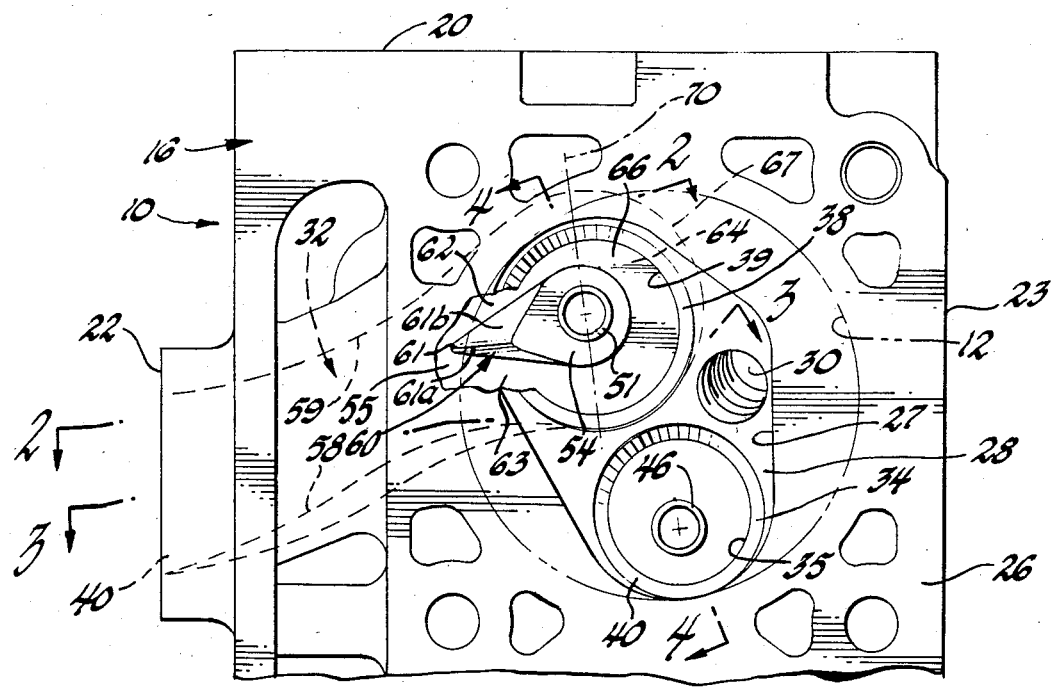
FIG. 1 is a fragmentary lower plan view of the cylinder head of an engine having an intake port in accordance with the invention as seen from the plane indicated by the line 1—1 of FIG. 2.

Referring now to the drawings in detail, numeral 10 generally indicates an internal combustion engine formed in accordance with the invention. Engine 10 conventionally includes a cylinder block 11 having a plurality of cylinders 12 only one of which is shown. Pistons 14 are provided, one in each of the cylinders, and connecting rods 15 connecting the respective pistons with a crankshaft, not shown, supported in the cylinder block.

A cylinder head 16 is mounted upon an upper end wall 18 of the cylinder block to close the adjacent ends 19 of the cylinders. The cylinder head includes end walls 20, first and second side walls 22, 23 respectively and top and bottom walls 24, 26 respectively, the latter being seated upon the engine block upper end wall 18.

At each cylinder location, a combustion chamber recess 27 is formed in the cylinder head bottom wall at the end 19 of each cylinder opposite top of its piston 14. The piston, cylinder and cylinder head, including the recess 27, form a variable volume working and combustion chamber 28. Connecting with the combustion chamber in the recess 27 are: a spark plug opening 30, an exhaust port 31 and an intake port 32 formed in accordance with the invention.

The spark plug opening 30 conventionally receives a spark plug, not shown, having a spark gap within the combustion chamber recess. The exhaust port 31 extends from a circular exhaust valve seat 34 and throat 35, which open to the combustion chamber, along a curved flow path to an exhaust opening 36 through the second side wall 23 of the cylinder head for connection to an exhaust manifold, not shown.

Figure 2:
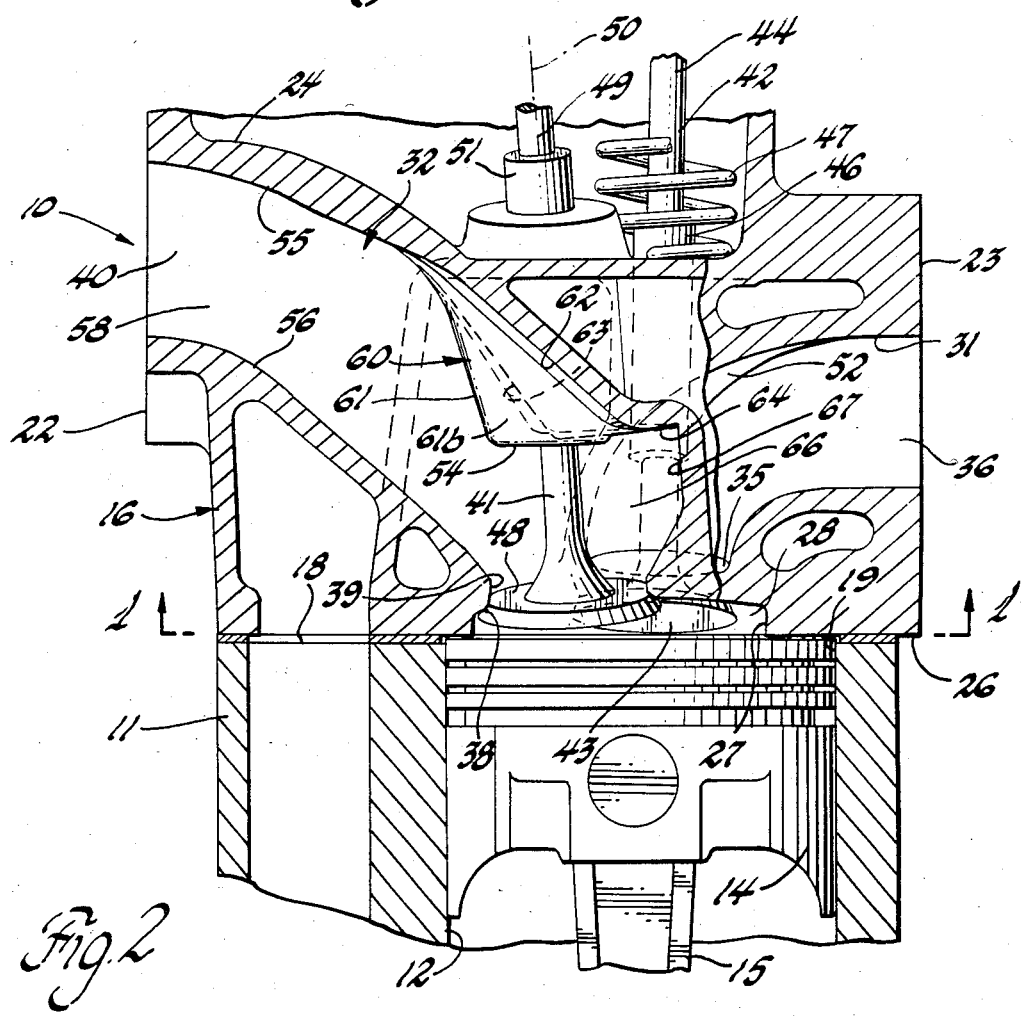
FIG. 2 is a cross-sectional view of the engine through the cylinder head intake port showing the lower angled ramp from the plane indicated by the line 2—2 of FIG. 1.

The intake port 32 extends from a circular intake valve seat 38 and an adjacent throat portion 39 along a path, to be subsequently further described, to an inlet opening 40 through the first side wall 22 of the cylinder head for connection with an intake manifold not shown. Poppet intake and exhaust valves 41, 42, shown only in FIGS. 2 and 3, are provided for the intake and exhaust ports 32, 31 respectively. The exhaust valve 42 includes a circular head 43 that is seatable on the valve seat 34 and is supported by a valve stem 44 carried in a valve guide 46 mounted within the top wall 24 of the cylinder head. A spring 47 and conventional valve actuating mechanism, not shown, are provided to actuate the exhaust valve in timed relation to the engine crankshaft rotation.

The intake valve 41 likewise includes a head 48 which is seatable upon the valve seat 38 to close and open flow through the intake port 32. A valve stem 49 extends on an axis 50 of reciprocation from the head of each intake valve and is reciprocably carried in a valve guide 51 mounted in the cylinder head top wall 24 in suitable guide bosses 52, 54. Like the exhaust valve, the intake valve 41 is actuated by suitable valve gear, not shown, in timed relation with engine crankshaft rotation. The valves 41, 42 operate in conventional fashion to open and close the intake and exhaust ports, respectively, to gas flow.

In accordance with the invention, the shape of the intake port 32 is such as to develop charge swirl in the cylinder intake charges without unduly restricting the maximum flow of intake charges into the respective engine cylinders. In order to adequately visualize the shape of the intake port shown within the cylinder head illustrated in FIGS. 1–4, the drawings further illustrate, in FIGS. 5–7, the configuration of a core usable for casting an inlet port according to the desired shape. In enumerating the features of construction of the port 32, the corresponding features of the core will be given identical numerals to clearly illustrate the relationship of these features. Therefore, it should be understood that the reference numerals used in FIGS. 5, 6 and 7 illustrating the core actually refer to the corresponding features of the intake port which is formed by the core.

Extending from the inlet opening 40, the port 32 includes a passage surrounding surface which may, for descriptive purposes, be divided into four walls including an upper wall 55, a lower wall 56 and left and right side walls 58, 59 respectively. The shape of the inlet opening 40 is essentially circular and the various top, bottom and side walls are connected with one another by generous arcuate surfaces and are formed with both single and compound curvatures to extend smoothly inward from the inlet opening 40. Thus, it will be understood that the separation or dividing lines between the connecting walls are not well defined and that the differing numerals are utilized primarily for purposes of description rather than otherwise. It should also be understood that the particular shape of the walls in the inlet portion of the port is not critical as affecting features of the invention, except that it is desirable that a smooth flow path be provided for inlet charges directed toward the engine combustion chamber.

Approaching the valve stem 49 from the inlet opening 40, the intake port upper wall 55 is interrupted by the downwardly extending valve guide boss 54 which has an upstream fairing, sometimes called a guide vane 60, which extends upwardly along the center of the upper wall 55 to provide a smooth division of flow passing along the upper wall on either side of the valve guide and stem. The guide vane 60 includes an upstream edge 61 connected with the valve guide boss 54 by two faces 61a, 61b which lie generally parallel with the direction of flow on the opposite sides of the guide boss with which these faces are respectively connected.

The presence or absence of a depending valve guide boss and/or an attached guide vane on the leading edge thereof, is also not critical to the concepts involved in the present invention, although shown and utilized in the illustrated embodiment.

Along the upper wall, on either side of the guide boss and associated guide vane 60, the intake port is provided with downwardly angled outer and inner ramp portions 62, 63 respectively. The outer ramp portion is so referred to by virtue of the fact that it extends downwardly over and in nearly tangential relation with, as viewed from above or below, the adjacent portion of the wall of the associated engine cylinder. The inner ramp portion extends on the other side of the valve boss and guide vane and is angled generally toward the central portion of the combustion chamber.

An essential feature of the invention is that the angles of the two ramp portions differ substantially. Thus, the inner ramp portion 63 is at a substantially steeper angle (up to 10° or more) than that of the outer ramp portion 62 as measured from a plane parallel with the bottom wall 26 of the cylinder head. At their lower ends, the ramp portions 62, 63 merge with a shelf portion 64 extending smoothly from the ends of the ramp portions at locations on generally opposite sides of the valve guide and associated valve axis. The shelf portion extends beyond the ramp ends in a direction generally parallel with the cylinder head bottom wall 26 and occupies a position spaced from and in generally opposing relation to the throat portion 39 of the intake port. At the port end below the shelf portion and around the axis of the intake valve 41, an open bowl or bowl swirl chamber 66 is provided. The swirl chamber is generally centered on the valve axis and defined by convergence of the left and right side walls 58, 59 in cylindrical fashion around the valve axis to meet at the distal end 67 of the port. The lower portion of the swirl chamber is tapered inwardly to merge with the throat portion 39.

It should be noted that due to a slight angularity of the valve axis with respect to the cylinder axis in the illustrated embodiment, the port configuration as seen in FIG. 1 is slightly off center from the valve axis and extends farther toward the outer edge of the cylinder than toward the center. However, FIGS. 5–7 show that the flow area on either side of the valve guide boss is approximately equal.

The differing angular slopes of the ramp portions 62, 63 have the effect of extending the length of the shallower outer ramp portion 62 and shortening the length of the steeper inner ramp portion 63. Accordingly, the ramps intersect the shelf portion 64 at staggered locations on opposite sides of the valve axis as indicated by the diagonal lines 70 of FIGS. 1, 6 and 7 which roughly indicate the intersections of the ramps with the shelf on either side of the valve boss.

As a result of this construction, intake charge flow guided by the outer ramp portion 62 is led relatively far and somewhat tangentially into the swirl chamber 66 of the port on the outer side of the valve stem to cause swirl in a counterclockwise direction as viewed from the top of the port (clockwise as viewed from the bottom in FIG. 1). Flow guided by the steeper inner ramp portion is forced in a more downward direction toward the intake port throat 39 on the inner side of the valve stem. Thus, the steeper slope of the inner ramp not only reduces the rate of gas flow slightly on the inside of the port (by virtue of a greater change of direction) but also directs this flow in a more downward direction so that it has less of an effect on gas swirl. Accordingly, the overall effect of the ramp portions is to create counterclockwise swirl while providing large relatively unimpeded flow paths on both sides of the intake valve stem and guide boss to permit relatively unrestricted flow of intake charge when the wide open throttle or full load condition is in effect.

Preferably, the port configuration as viewed from a plane normal to the intake valve axis, or the cylinder axis as shown in FIGS. 1 and 6, is such as to provide relatively straight line flow in the port from the portion just upstream of the valve guide, or guide wing, to the outer side of the valve guide, or axis, underneath the shallower ramp 62. Flow to the inner side of the valve guide, or axis, under the steeper ramp 63 instead requires a slight change or offset in flow direction. This complements the effect of the ramp angle difference and provides a further slowing of flow in slight degree along the inner side of the valve axis as compared to the outer side, thus adding to the port's swirl developing capability.

In the particular example of the intake port configuration illustrated in the drawings, the port inlet opening 40 lies at a height above the throat 39 of about two times the diameter of the valve head 48. The central passage slopes downwardly at an angle of about 30°–45°. The ramps 62, 63 lie at fairly steep angles of 30°–60° with the plane of the head lower wall 26. The angle of the inner ramp 63 is preferably about 10° or more steeper than the angle of the outer ramp 62.

In the swirl bowl the diameter is somewhat greater than that of the port throat and the height from the throat 39 or valve seat 38 to the shelf 64 is similar to the diameter of the valve head 48. The flow area on either side of the valve guide is about evenly divided by the valve guide boss and guide vane. Also the shelf area equals about 40–50% of the bowl area in a horizontal plane parallel with the head bottom wall 26.

In flow box tests of a port according to the present design compared with a non-swirl open type port and a conventional helical swirl type port, the present invention developed swirl and flow characteristics superior to both and higher than either one in a substantial portion of the flow range. Among features of the design which are considered important in obtaining this result are the enlarged bowl portion above the port throat and partially covered by the flat shelf and the connecting ramp portions of differing angular slopes which alter the flow rates of the portions of the charge passing on either side of the valve stem and direct that flow at different angles so as to create a substantial swirl in the swirl bowl portion 66 which carries on through the throat 39 into the combustion chamber.

While the invention has been described by reference to a specific embodiment chosen for purposes of illustration, it should be understood that numerous changes could be made without departing from the inventive concepts described. Accordingly, it is intended that the invention not be limited to the described embodiment but that it have the full scope permitted by the language of the following claims.

The embodiments of the invention in which an exclusive property or privilege is claimed are defined as follows:

1. In an internal combustion engine, means defining a cylinder closed at one end and having an axis, means defining an inlet passage through the cylinder defining means and communicating with the cylinder through the closed end, and a poppet inlet valve including a stem and head having a valve axis and disposed in the passage for reciprocation on said valve axis to control communication of the inlet passage with the cylinder, said inlet passage being characterized by a throat of generally circular cross-section opening into the cylinder and adapted to be closed by the inlet valve, an entrance portion spaced from the throat and offset from the valve axis, and means defining a fluid flow path extending from the entrance portion toward and around opposite sides of the valve axis and below the valve head when open to the throat, said fluid flow path defining means having a top wall including first and second ramp portions and a shelf portion spaced from and opposite the throat, said ramp portions sloping downwardly and merging with the shelf portion on generally opposite sides of the valve axis, the ramp portions lying at steep angles to the shelf portion and one of the ramp portions having a substantially steeper angle than the other to slow and direct downwardly fluid flow passing the one of said sides of the valve axis below said one steeper ramp relative to the higher speed and less downward direction of flow passing the other of said sides of the valve axis, whereby preferential entry of swirl developing flow into the shelf area from below the ramp of lower slope is encouraged.

2. In an internal combustion engine, a cylinder having an axis, a cylinder head closing one end of the cylinder, means defining an inlet passage through the cylinder head and communicating with the cylinder through the closed end, and a poppet inlet valve having a valve axis and reciprocably disposed in the passage for controlling communication of the inlet passage with the cylinder, said inlet passage being characterized by a throat of generally circular cross-section opening into the cylinder and adapted to be closed by the inlet valve, an entrance portion spaced from the throat and offset from the valve axis, and means defining a fluid flow path extending from the entrance portion toward and around opposite sides of the valve axis to the throat portion, said fluid flow path defining means including a valve guide boss surrounding the valve axis and projecting part way into the flow path, and a top wall including first and second ramp portions and a shelf portion, said shelf portion extending from adjacent the end of the guide boss in generally spaced and opposing relation to the throat, and said ramp portions merging with the shelf portion adjacent the guide boss, said ramp portions sloping downwardly on opposite sides of the valve axis and at steep angles to the shelf portion, one of the ramp portions having a substantially steeper angle than the other, to slow and direct downwardly fluid flow in passing the one of said sides of the valve axis below said one steeper ramp relative to the higher speed and less downward direction of flow passing the other of said sides of the valve axis, whereby preferential entry of swirl developing flow into the shelf area from below the ramp of lower slope is encouraged.

3. A combination as in claim 2 wherein said inlet passage is configured so that flow on said one side of the valve axis below the steeper ramp forms a greater angle with flow in the passage immediately upstream of the valve guide than does flow on said other side of the valve axis below the shallower ramp, said greater angle being as measured in a plane normal to the valve axis, whereby preferential flow into the shelf area from said other side of the valve axis is further encouraged.

4. A combination as in claim 3 wherein said valve guide boss includes a flow splitter having two faces tangent to opposite sides of the valve guide and intersecting in an upstream edge, one of said faces being associated with flow on said other side of the valve axis and lying substantially parallel to such flow, said one face being approximately aligned with fluid flow in the passage immediately upstream of the splitter and the other of said faces being disposed at a substantial angle to said flow.

5. In an internal combustion engine, a cylinder having an axis, a cylinder head closing one end of the cylinder, means defining an inlet passage through the cylinder head and communicating with the cylinder through the closed end, and a poppet inlet valve having a central axis offset to one side of the cylinder axis and reciprocably disposed in the passage for controlling communication of the inlet passage with the cylinder, said inlet passage being characterized by a throat of generally circular cross-section centered on said valve axis and opening into the cylinder adjacent one side thereof, said inlet valve being operative to open and close said throat opening, an entrance portion spaced from the throat and offset from the valve axis, and means defining a fluid flow path extending from the entrance portion toward and around opposite sides of the valve axis to the throat portion, said flow path around the valve axis being split into an inner leg adjacent the cylinder axis and in outer leg adjacent said side of the cylinder, said fluid flow path defining means including a valve guide boss surrounding the valve axis and including a valve guide boss surrounding the valve axis and projecting part way into the flow path between the inner and outer legs thereof, and a top wall including first and second ramp portions and a shelf portion, said shelf portion extending from adjacent the end of the guide boss in generally spaced and opposing relation to the throat, and said ramp portions merging with the shelf portion adjacent the guide boss, said ramp portions sloping downwardly on opposite sides of the guide boss and at steep angles to the shelf portion, one of the ramp portions forming a wall of the inner flow path and having a substantially steeper angle than the other, to slow and direct downwardly fluid flow in said inner leg relative to the higher speed and less downward direction of flow in the outer leg defined in part by the shallower ramp portion, whereby preferential entry of swirl developing flow into the shelf area from below the ramp of lower slope in encouraged.

6. A combination as in claim 5 wherein said inlet passage is configured so that flow in said outer leg is substantially tangential with said cylinder side and the flow direction of said inner leg forms a substantially greater angle with flow in the passage immediately upstream of the valve guide than does flow in said outer leg, said greater angle being measured in a plane normal to the cylinder axis whereby preferential flow into the shelf area from said outer leg is further encouraged.

7. A combination as in claim 6 wherein said shelf portion lies in a plane substantially normal to the cylinder axis.

8. A combination as in claim 7 wherein said valve guide boss includes a flow splitter having two faces tangent to opposite sides of the valve guide and intersecting in an upstream edge, one of said faces in part defining said outer leg of the flow path and being approximately aligned with the direction of fluid flow in the passage immediately upstream of the splitter and the other of said faces being disposed at a substantial angle to said upstream flow.

* * * * *